United States Patent [19]

Bremmer

[11] Patent Number: 4,485,418
[45] Date of Patent: Nov. 27, 1984

[54] SYSTEM AND METHOD OF LOCATING THE CENTER OF A TRACK ON A MAGNETIC STORAGE DISK

[75] Inventor: Robert A. Bremmer, Oklahoma City, Okla.

[73] Assignee: Magnetic Peripherals, Inc., Minneapolis, Minn.

[21] Appl. No.: 407,324

[22] Filed: Aug. 12, 1982

[51] Int. Cl.³ .................. G11B 5/56; G11B 21/10
[52] U.S. Cl. .................................................. 360/77
[58] Field of Search .................. 360/77, 78; 369/43, 369/56

[56] References Cited

U.S. PATENT DOCUMENTS 4,157,577 6/1979 Porter, Jr. et al. ............... 360/77
4,371,960 2/1983 Kroiss ................................ 369/43

Primary Examiner—George G. Stellar
Attorney, Agent, or Firm—Edwin H. Crabtree

[57] ABSTRACT

A system and method of accurately locating the center of a previously recorded magnetic track on a rotating magnetic storage disk and moving a transducer to the center of the track. The system measures in increments the amplitude of the feedback signal as the transducer is moved to each side of the recorded track and compares the signal amplitude measured with a predetermined reference level. Through the use of an offset measuring system connected to a computer processor the number of increments moved in each direction is recorded and a simple calculation is made to determine the center of the magnetic track. The transducer for recording and replaying information on the disk is then moved to the center of the track.

6 Claims, 4 Drawing Figures

SYSTEM AND METHOD OF LOCATING THE CENTER OF A TRACK ON A MAGNETIC STORAGE DISK

BACKGROUND OF THE INVENTION

This invention relates to the locating of the center of a recorded track and more particularly but not by way of limitation to locating the center of a recorded magnetic track on a rotating magnetic storage disk unit.

In the use of flexible media substrates recording accuracy is presently limited by media dimensional changes as a result of temperature and humidity variations. Also interchange of recorded media between units may also be limited by individual positioner accuracies and initial calibration. The flexible media grows and contracts with atmospheric changes. Thus the radius of any prerecorded track also changes. Therefore, it is difficult to determine how far the recorded track has moved from its nominal position. Compensation for this change requires that the read/write transducer positioning system must be capable of compensating motion.

Signal amplitude as a function of the transducer position is shown in the drawings and has a shape in a curve which is largely independent of the disk media and the transducer position. Typically the curve shape will be symmetrical with peak and skirt positions ill defined. Signal amplitude will be the same for a given displacement either side of the nominal track centerline. This fact is used as a bases for establishing the track center and the system and method described herein. Heretofore, there have been various types of systems and methods for positioning a transducer over a recorded track on a flexible or rigid magnetic storage disk. In particular, a positioning system is described in U.S. Pat. No. 4,122,503 to Allan. This patent and the previously used systems do not describe or point out the unique features for accurately locating the center of a previously recorded magnetic track as described herein.

SUMMARY OF THE INVENTION

The subject invention describes a system for accurately locating the center of a previously recorded track on a rotating magnetic disk media. The invention has particular application to flexible disk in which recording accuracy is presently limited by media dimensional changes as a result of temperature and humidity variations.

The system and method for locating the center of a previously recorded track accurately locates the center of the track irrespective of variations in temperature, humidity or initial location of the transducer.

Further the invention described herein permits disk drive units to be operated at higher track densities thus increasing total disk storage capacity.

The system for accurately locating the center of a previously recorded magnetic track on a rotating magnetic storage disk includes a transducer for recording and replaying signal information on the disk. A motor is attached to the transducer for moving the transducer over a nominal position of the track and moving the transducer in increments along the positive and negative slope of the sides of the signal amplitude of the track. A computer processor having memory storage is connected to the motor. The processor upon receiving a calibration command causes the motor to move the transducer a small increment across the track width. An offset measuring system is connected to the transducer and the processor for determining if the signal received at each increment step is greater than a reference level.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
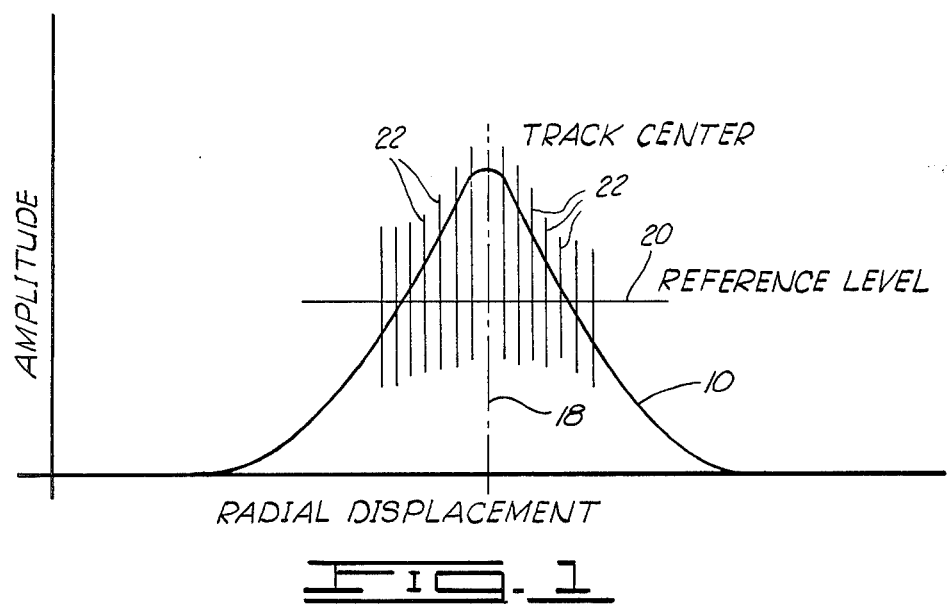
FIG. 1 represents the recorded signal amplitude of a single track as seen by a transducer moving perpendicular to the track.
Figure 3:
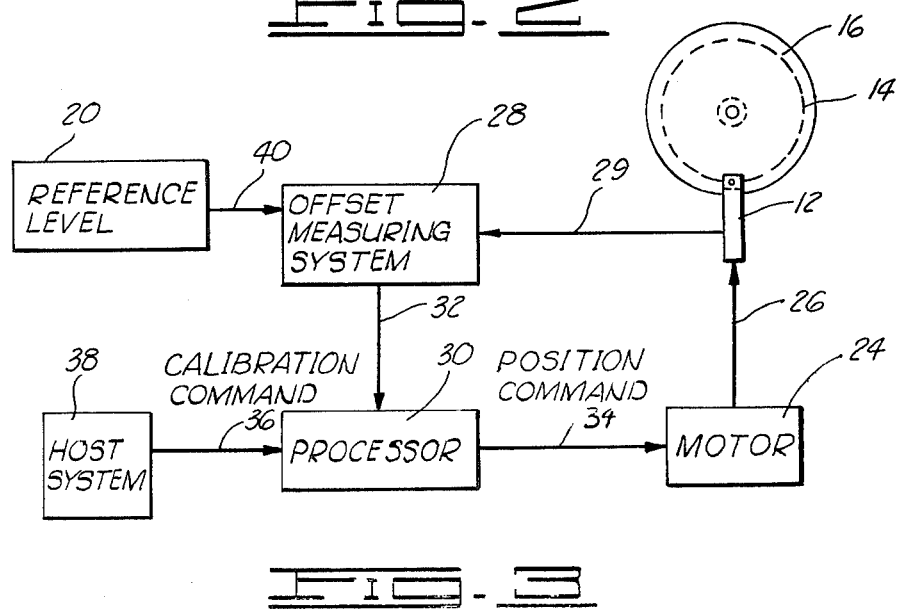
FIG. 3 diagrams the major components of the system for accurately locating the center of the previously recorded magnetic tracks.

In FIG. 1 a representation of a recorded signal amplitude designated by reference numeral 10 is shown from a single track as seen by a transducer 12 moving perpendicular to a track 14 on a rotating magnetic storage disk 16. The transducer 12, track 14 and disk 16 are shown in FIG. 3. In FIG. 1 the amplitude of the signal 10 is shown in relation to the radial displacement to the left and right of a track centerline 18. As mentioned above, the shape of the signal curve 10 is symmetrical with the signal amplitude being the same for a given displacement on either side of the track centerline 18. A predetermined reference amplitude 20 is shown and may be of any value but is typically in the range of one half of the peak to valley amplitude. Also shown in FIG. 1 are a plurality of lines 22 indicating typical increments in which the transducer 12 may be moved prior to determining the exact position of the track center 18. In this case six increments to the left and six increments to the right of the centerline 18 are shown before the increment steps would fall below the reference level 20.

Figure 2:
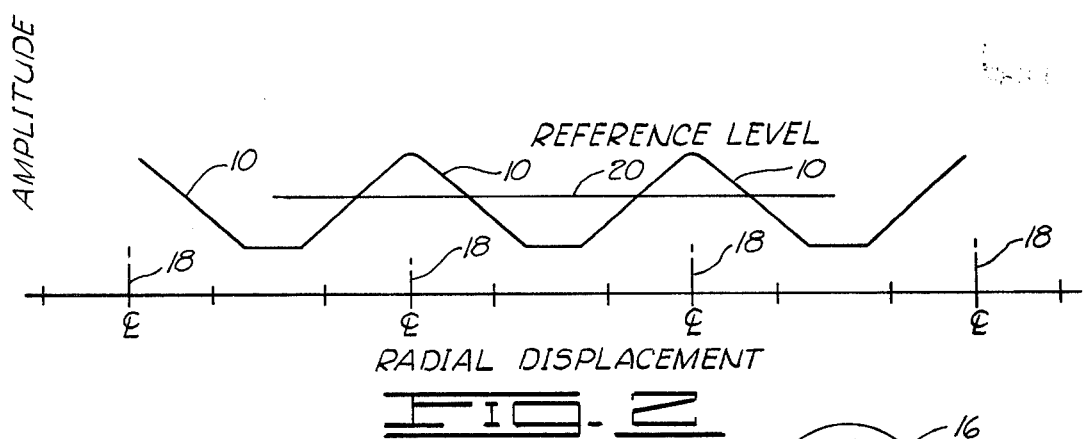
FIG. 2 is a representation of the recorded signal amplitude of several tracks as seen by the transducer moving perpendicular to these tracks. In this example the transducer width is greater than 50% of the track centerline to centerline distance.

In FIG. 2 a representation of recorded signal amplitudes 10 of several tracks can be seen by having the transducer moving perpendicular to these tracks. In this Figure the recorded track width is approximately 60 percent of the centerline to centerline between the tracks.

In FIG. 3 the major elements of the system for accurately locating the center of a previously recorded magnetic track are shown. They include a motor 24 connected to the transducer 12 via lead 26. The transducer 12 is also connected to an offset measuring system 28 via lead 29. The offset measuring system 28 is connected to a computer processor 30 having a memory therein and connected via lead 32. The processor 30 is connected to the motor 24 via lead 34 to give position commands thereto. A calibration command is given to the processor 30 via lead 36 by a host system 38 or in the alternative a unit power on sequence which is not shown may be used. The offset measuring system 28 receives the reference level 20 via lead 40.

The transducer 12 records and replays signal information to and from the rotating magnetic disk 16. The transducer 12 may be moved on a radial line in response to the signals from the position command given by processor 30 which is acted on by the motor 24.

In response to a calibration command which may be generated by the host system 38 or the unit power on sequence the processor 30 or any other equivalent electronic control directs the motor 24 to position the transducer 12 at a nominal position on the track 14. Under many operating conditions, this nominal position will not be coincident with the track center 18. Execution of the following sequence will locate the track center 18.

Upon receipt of the calibration command, the processor 30 causes the motor 24 to move the transducer 12 toward the disk center by a small increment of the track center to center spacing. A record of this motion is tallied in the memory storage system in the processor 30 at location $M_1$. After this move is completed, a comparator 42 shown in FIG. 4 which is part of the offset measuring system 28 determines whether the transducer amplitude is greater than the reference level 20. If this condition is true, the motor 24 is caused to again move the transducer 12 inward by the same increment. This sequence is continued until the transducer signal amplitude 10 becomes less than the reference level 20. When this condition is reached, the total number of increments moved is stored in the memory in the processor 30 at location $M_1$.

The processor 30 then directs the motor 24 to its initial position. The direction of incremental motion is then reversed and the processor 30 directs an incremental step toward the outer edge of the track 14. A record of this motion is tallied in the memory of the processor 30 at location $M_2$. Again, the transducer signal amplitude 10 is compared to the reference level 20. If the signal amplitude is greater the motor is again directed to move the transducer outward. Again, this motion continues until the signal amplitude 10 becomes less than the reference level 20. When this condition is reached the total number of incremental steps made from the nominal position is stored in the processor's memory at $M_2$.

The transducer may then be moved to the actual track center 18 by returning to the nominal position and then moving $(M1-M2)/2$ increments. If M1 is greater than M2, the direction of incremental motion is toward the inner edge of the track. If M2 is greater than M1 the movement is toward the outer edge of the track. By setting the appropriate reference level in relationship to the peak signal amplitude of the recorded signal 10, this track centering method may be used in conjunction with widely spaced isolated tracks or with a variety of standard flexible or rigid disk storage recording formats.

Figure 4:
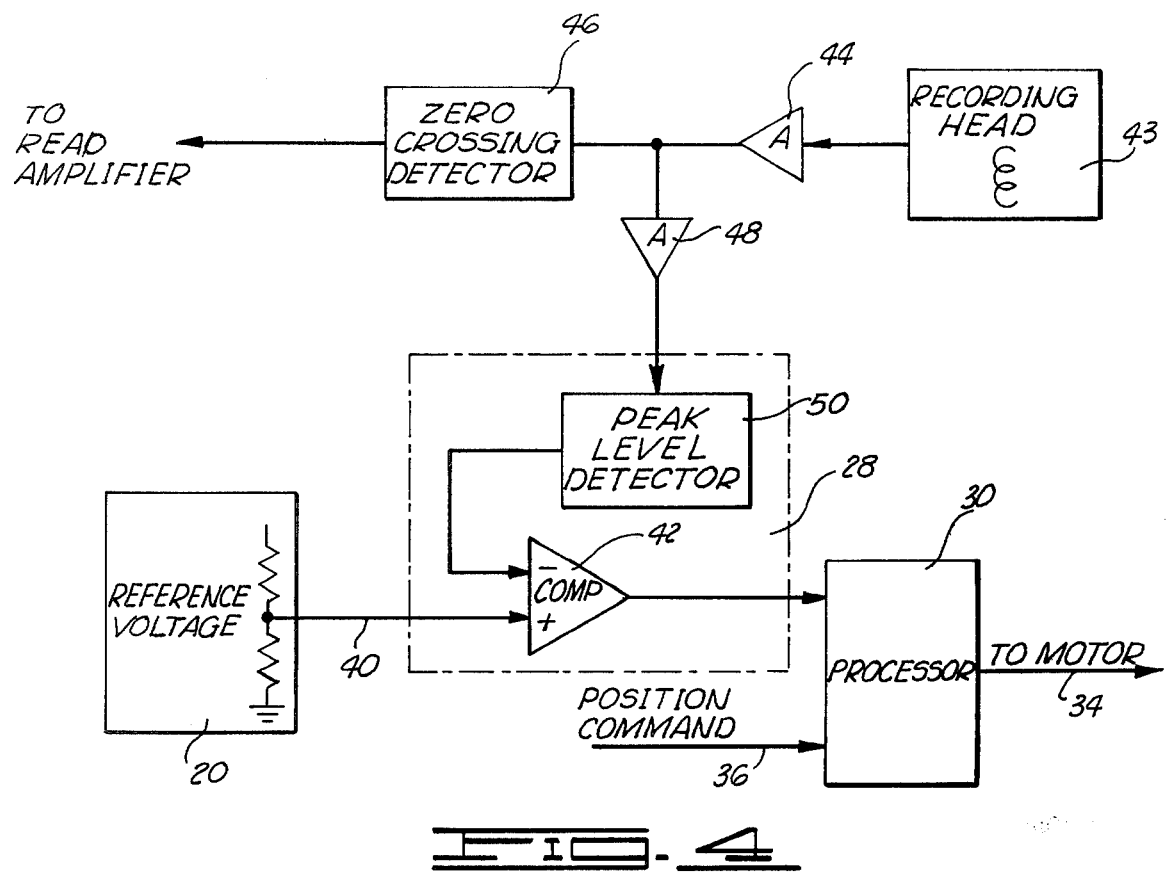
FIG. 4 illustrates the offset measuring system components.

In FIG. 4 the offset measuring system 28 is shown in greater detail. The normal disk drive read signal path detects the recorded information signal 10 with a recording head 43. This small signal is passed through an initial amplifier 44 generally having a band pass limited to the expected maximum signal frequency. This signal is then passed to a zero crossing detector 46 which may consist of differentiating circuitry and a high gain amplifier. The output is a digital signal which has transitions corresponding to waveform peaks in the initial recording head signal. This signal may be further processed in either the disk drive or elsewhere in the system to complete restoration of the initial recorded information.

The signal for the offset measuring system 28 may be derived from any point in the main read signal path prior to the signal becoming digitized. In this example, it is received between the amplifier 44 and the zero crossing detector 46. Depending on the characteristics of the initial amplified output signal and other signal path components an offset signal amplifier 48 may or may not be required. A peak level detector 50 which is part of the offset measuring system 28 converts the AC signal to a DC value whose amplitude is proportional to the amplitude of the initial signal detected by the recording head 43 and eliminates the AC components from the offset measuring signal 10.

The output of the peak level detector 50 is passed to the comparator circuit 42 where its value is compared to that of the reference level 20. The reference level 20 is selected to have a value more or less midway between the maximum and minimum track signal amplitude as shown in FIGS. 1 and 2. The comparator output 42 will be a logical high value when the offset signal at the comparator 42 is greater than the reference voltage level 20. This condition corresponds to the recording head 43 being located near the center of the recorded track 14. When transducer 12 moves the recording head 43 away from the track center 18 in either direction as shown in FIGS. 1 and 2, the amplitude of the offset signal 10 will be reduced. When this signal reaches a level less than that of the reference level 20 output of the comparator circuit 42 will switch to a logical low level.

As mentioned above, the comparator 42 output level will be a logical high when the recording head 43 is located near the track center. The comparator 42 output will be a logical low when the transducer 12 moves the head 43 a sufficient distance in either direction to reduce the output of the peak level detector 50 below that of the reference voltage level 20. The comparator 42 output state with proper interpretation by microprocessor 30 may then be used to calculate the established track center 18.

Changes may be made in the construction and arrangement of the parts or elements of the embodiments as described herein without departing from the spirit or scope of the invention defined in the following claims.

What is claimed is:

1. A system for accurately locating the center of a previously recorded magnetic track on a rotating magnetic storage disk, the system measuring in increments across the track width a signal amplitude of the track above and below a predetermined reference level, the system comprising:
   a transducer for recording and replaying signal information from the disk;
   a motor attached to the transducer for moving the transducer over a nominal position of the track and moving the transducer in increments across the track width;
   a computer processor having memory storage therein and connected to the motor, the processor upon receiving a calibration command causing the motor to move the transducer in small increments across the track width;
   an offset measuring system connected to the transducer and the processor for determining if the signal amplitude is greater or less than the reference level after each increment movement.

2. The system as described in claim 1 wherein the calibration command to the processor is generated by a host system.

3. The system as described in claim 1 wherein the calibration command to the processor is generated by a unit power-on sequence.

4. The system as described in claim 1 wherein the offset measuring system includes a peak level detector for receiving the signal amplitude from the transducer and a comparator circuit connected to the peak level detector, the comparator circuit comparing the signal amplitude to the predetermined reference level, the comparator connected also to the processor for signaling the processor when the signal amplitude received is of a value above or below the reference level.

5. A system for accurately locating the center of a previously recorded magnetic track on a rotating magnetic storage disk, the system measuring in increments across the track width a signal amplitude of the track above and below a predetermined reference level, the system comprising:
- a transducer for recording and replaying signal information from the disk;
- a motor attached to the transducer for moving the transducer over a nominal position of the track and moving the transducer in increments across the track width;
- a computer processor having a memory storage therein and connected to the motor, the processor upon receiving a calibration command causing the motor to move the transducer in small increments across the track width; and
- an offset measuring system connected to the transducer and the processor, the offset measuring system having a peak level detector for receiving the signal amplitude, the peak level detector connected to a comparator circuit, the comparator circuit comparing the signal amplitude to the predetermined reference level, the comparator connected to the processor for signaling the processor when the signal amplitude received is of a value above or below the reference level.

6. A method for accurately locating the center of a previously recorded magnetic track on a rotating magnetic storage disk, the system measuring in increments the signal amplitude of the track as a signal detecting transducer is moved incrementally and compares the detected signal with a predetermined reference level, the steps including:
- sending a calibration command to a computer processor having memory storage therein, the processor connected to a motor for driving a transducer over the disk for recording and replaying signal information on the disk;
- moving a transducer across a fraction of the track through motor action;
- receiving a signal amplitude of the track by an offset measuring system, the offset measuring system connected to the transducer and the processor, the offset measuring system determining if the signal amplitude is greater or less than the reference level;
- signaling the processor to have the motor move the transducer in increments toward one side of the track until the signal amplitude becomes less than the reference level;
- signaling the processor to have the motor move the transducer to the original nominal position and then move in increments to the opposite side of the track until the signal amplitude becomes less than the reference level;
- signaling the processor to have the motor move the transducer to its original nominal position and then move a calculated number of increments either toward one side of the track or toward the opposite side of the track based on the number of increments moved to one side of the track less the number of increments moved to the opposite side of the track, this total number of increments divided by two.

* * * * *